Sept. 8, 1970 J. G. BELLESON 3,528,036

FM MODULATOR FOR VIDEO RECORDING

Filed July 12, 1968

*INVENTOR*

JAMES G. BELLESON

BY [signature]

ATTORNEY

United States Patent Office
3,528,036
Patented Sept. 8, 1970

3,528,036
FM MODULATOR FOR VIDEO RECORDING

James G. Belleson, Los Gatos, Calif., assignor to International Business Machines Corporation, Armonk, N.Y., a corporation of New York Filed July 12, 1968, Ser. No. 744,402
Int. Cl. H03c *3/18*; H03b *7/08*
U.S. Cl. 332—16 5 Claims

ABSTRACT OF THE DISCLOSURE

A modulator with a nonsaturating current switch having two branches, each branch having a transistor, and these transistors having common emitters connected to a constant current source. In such a conventional current switch, the transistors must be alternately conductive. The base of the first transistor is connected to a fixed potential, and the base of a second transistor is connected to a tunnel diode. When the base of the second transistor is above a fixed potential, only the second transistor will conduct; but when the base of the second transistor is below the fixed potential, the first transistor will conduct. A signal source is connected across a charging capacitor as well as across the first transistor and the constant current source. The voltage on the capacitor is sensed through a third transistor connected to a tunnel diode. Thus, during nonconduction of the first transistor, the charging capacitor will be charged by the signal source. When the voltage on the charging capacitor reaches a predetermined amplitude, the tunnel diode switches. At this point, the second transistor becomes nonconductive and the first transistor conducts to thereby provide a discharge path for the capacitor through the first transistor and the common current source. When the charging across the capacitor is lowered sufficiently, the current through the tunnel diode increases the potential on the base of the second transistor above the fixed potential and the cycle then repeats.

As the modulating signal is varied, the charging time of the capacitor is varied and thereby the frequency of the output signal across the capacitor is varied.

BACKGROUND OF THE INVENTION

Field of the invention

Frequency modulators.

DESCRIPTION OF THE PRIOR ART

In certain application of frequency modulation, such as in video recording, it is desirable to have a relatively large deviation from the center frequency with good linearity. A conventional modulator capable of this performance uses two LC oscillators, one at 100 and one at 112 mc., which are modulated and beat together to give a 12 mc. center frequency. Such a modulator, however must cope with the problems at these relatively high frequencies and in addition such a modulator, as can be understood, is quite expensive.

SUMMARY OF THE INVENTION

It is an object of the invention to provide a new and improved modulator.

A further object of the invention is the provision of a new and improved modulator for frequency modulation, which is capable of a relatively large linear deviation from the center frequency.

A still further object of the invention is to provide a new and improved frequency modulator which is capable of very high center frequencies and very large linear deviations.

The above objects of the present invention are accomplished by utilizing a nonsaturating current switch having two branches with alternately conductive transistors positioned in each branch. These transistors are connected to a constant current source. A charging capacitor is connected across the first transistor as well as a modulating signal source. When a second transistor renders the first transistor nonconductive, the signal source will charge the capacitor. When the capacitor receives a predetermined charge, the first transistor will conduct to thereby provide a discharge path for the charging capacitor. As the signal source varies, the charging time of the capacitor varies to thereby vary the frequency. Due to the inherent high speed of the nonsaturating current switch, very high frequencies are achieved and it has been discovered that very large deviations can also be achieved.

As a further feature of the invention, a tunnel diode is employed which is responsive to a predetermined charge on the charging capacitor to effect conduction and nonconduction of the transistors. With the high speed switch and sensing of the tunnel diode a very high frequency modulator with very large deviation is thereby obtained.

GENERAL DESCRIPTION

Figure 1:
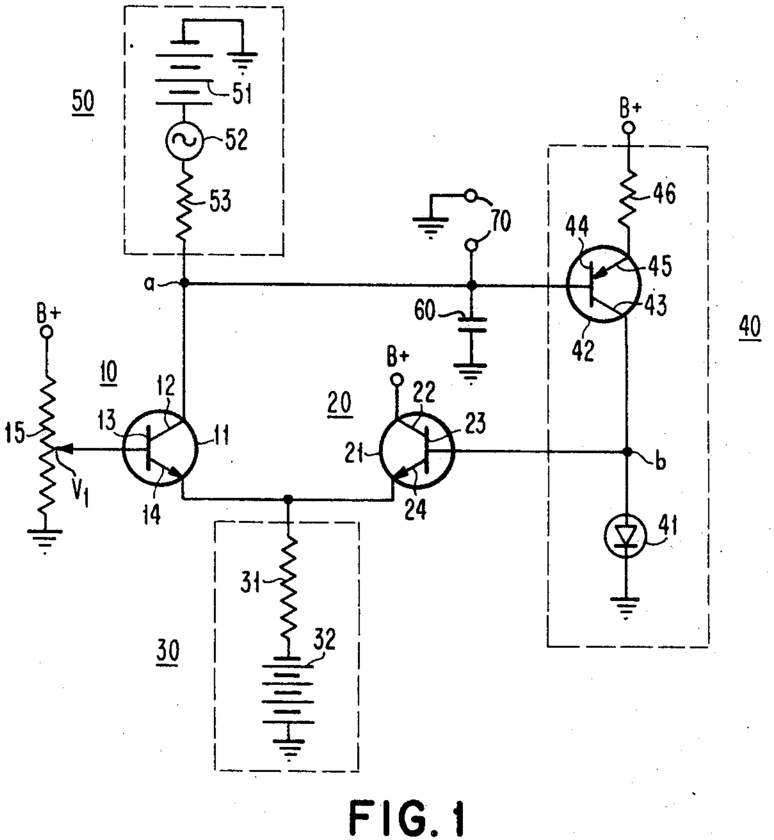
FIG. 1 illustrates a schematic diagram of a modulator embodying the invention.

As shown in FIG. 1, the modulator embodying the invention includes a nonsaturating current switch having two alternatively conductive branches 10 and 20 which are connected to a constant current source 30. The base of the transistor 11 in branch 10 is held in fixed potential and the base of the transistor 21 in branch 20 varies as the charge on capacitor 60. Branch 10 and a modulating source 50 are connected across the charging capacitor 60 so that when branch 20 is conducting (and branch 10 nonconducting) the modulating source 50 is charging capacitor 60. When this charge reaches a predetermined point, the sensing circuit 40 renders transistor 21 nonconductive and transistor 11 conductive. When transistor 11 is conductive, it provides a discharge path for capacitor 60 through branch 10 and current source 30. When the charge on capacitor 60 has been sufficiently discharged, sensing means 40 raises the voltage on the base of transistor 21 to render it conductive and the cycle is then repeated with transistor 21 rendered conductive and transistor 11 nonconductive.

SPECIFIC DESCRIPTION

In the first branch 10 of the current switch, there is included an NPN transistor 11 having a collector 12, a base 13 and an emitter 14. The base 13 is connected to a voltage source 15 such as a potentiometer, which is connected at one side to B+ and at the other side to ground. A wiper of potentiometer 15 is connected to base 13. This maintains base 13 at a predetermined positive potential with respect to emitter 14.

The second branch 20 of the current switch includes an NPN transistor 21 having a collector 22 connected to B+, a base 23 and an emitter 24. Emitters 14 and 24 are directly connected to a constant current source 30 illustrated by a high resistance 31 and a high voltage battery 32. As shown, the emitters 14 and 24 are connected to one side of resistor 31 which, in turn, is connected to the negative side of a D.C. source 32. The positive side of source 32 is connected to ground. A charging capacitor 60 has one end connected to ground and the other end is connected via point *a* to collector 12 as well as to the resistor 53 of signal source 50. Signal source 50 further includes an alternating current signal source 52, which is connected between resistor 53 and the positive terminal of D.C. source 51. The negative side of source 51 is grounded. The amplitude of the D.C. source 57 is greater than the peak to peak voltage of the signal source 52, so that the voltage and current impressed by source 50 across capacitor 60, will always be of the same polarity.

Point *a*, or one side of capacitor 60, is also connected to the threshold sensor 40. More specifically, point *a* is directly connected to the base 44 of a PNP transistor 42 having a collector 43 and an emitter 45. Emitter 45 is connected through a resistor 46 to a source of B+. Collector 43 is connected to a point *b* which is connected in turn to the anode of tunnel diode 41. The cathode of diode 41 is connected to ground.

Thus, it can be seen that the threshold sensor 40 acts between the capacitor 60 and the base of transistor 21. As the capacitor 60 charges, the voltage across resistor 46 is decreased, thereby causing the emitter to collector current of 43 to decrease. When this current reaches a critical value shown as point D on FIG. 2, the tunnel diode voltage at point *b* and base 23 changes to a value of less than the fixed potential of base 13. This is illustrated when the diode 41 goes from point D to A so that the potential at base 23 goes to a voltage substantially below the voltage of base 13, i.e. $V_1$.

Figure 2:
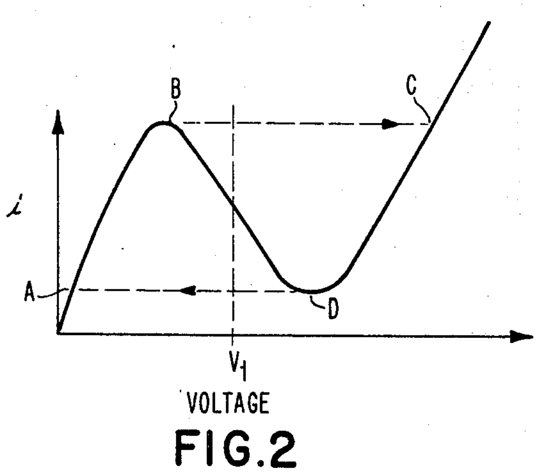
FIG. 2 illustrates a curve useful in explaining the invention.
Figure 3:
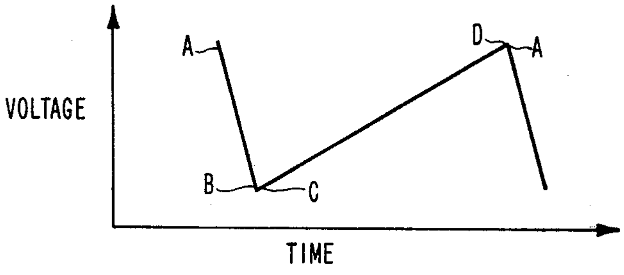
FIG. 3 illustrates a waveform useful in explaining the invention.

FIG. 2 illustrates the current vs. voltage curve of tunnel diode 41. The voltage across diode 41 is essentially the potential of base 23. FIG. 3 illustrates the output signal across terminals 70.

OPERATION OF THE INVENTION

When the transistor 10 is not conducting due to the base 23 being of higher potential than base 13, the modulating source 50 provides current to charge capacitor 60. As a result of the charging of capacitor 60, base 44 tends to go positive and the voltage at point *b*, that is, the voltage across the tunnel diode 41, decreases. The tunnel diode curve in FIG. 2, which is a current against voltage curve for the tunnel diode 41, shows the charging action of capacitor 60 on the tunnel diode as being that between C and D. Further, charging of the capacitor 60 results in a high speed switch of the tunnel diode from point D to point A on this curve. This transition in the characteristic curve commences the discharge of capacitor 60 at point A, as shown in FIGS. 2 and 3.

FIG. 3 illustrates the output waveform available at output terminal 70 which is the voltage across capacitor 60. When the tunnel diode state goes from point D to point A, the voltage across diode 41 passes below voltage $V_1$ which is the potential on base 13. As stated above, previous to this transition, transistor 21 was conducting and transistor 11 was nonconducting. When this transition occurs, transistor 21 quickly goes from a nonsaturating conductive state to a nonconducting state. Simultaneously, transistor 11 goes from a nonconducting state to a nonsaturating conducting state. Immediately after this, the transition illustrated as point A in FIGS. 2 and 3 occurs, and capacitor 60 discharges through transistor 11 and constant current source 30. Likewise, the current for the modulating source 50 passes through transistor 11 and constant current source 30.

Transistor 42 functions as a voltage controlled current source. During the charging portion of the cycle (C to D), this current decreases because the base voltage is increased. Conversely, during the discharging portion of the cycles (A to B) this current increases.

During the discharge period of capacitor 60, diode 41 goes from point A to point B on its characteristic curve so that the voltage across the diode 41 tends to increase. It will be noted that point B on the curve is still below the bias $V_1$ on base 13. Consequently, at point B transistor 11 continues to conduct. However, when diode 41 reaches point B, the voltage across diode 41 tends to increase and so it is quickly switched from point B to point C on the characteristic curve. This transition results in the voltage across the diode and the voltage on base 23 suddenly exceeding the voltage on the base 13 of transistor 11. As a result, the nonsaturating conducting transistor 11 becomes nonconductive and the transistor 21 becomes conductive with current passing through the constant current source 30. At this point, the capacitor 60 begins to be charged again by modulating source 50 and the voltage across the diode 41 starts to decrease. During the charging of capacitor 60, diode 41 and the output wave form (FIGS. 2 and 3) go from point C to D, the cycle being then repeated.

Thus, it is seen that during the charging period from point C to D, transistor 21 is a nonsaturating conductive state and transistor 11 is nonconductive with modulating source 50 charging capacitor 60. As the A.C. component from 52 varies the modulating source, the charge rate of capacitor 60 and the frequency of the waveform shown in FIG. 3 will be varied. During discharge, transistor 21 will be nonconductive and transfer 11 will be in a nonsaturating conductive state. The current from source 50 and the discharge current from capacitor 60 will then pass through transistor 11 and current souce 30. It will be noted that the charging current from source 50 is substantially less than the constant current supplied by source 30.

Thus, it is seen that by utilizing a nonsaturating current switch having alternately conductive nonsaturating transistors for charging a capacitor, high speed of switching is realized and this is particularly true when the high speed tunnel diode is employed to effect conduction and nonconduction of the branch of the switch that discharges the capacitor. Consequently, it is seen that the modulating source effects charging of the capacitor and one of the branches of the current switch effects discharging of the capacitor when actuated by the tunnel diode rendering thus the other branch nonconductive. When used as a modulator, the output is connected to a frequency divider such as a flip flop that divides the frequency by two. This eliminates nonsymmetry in the output waveform of the oscillator. Such an arrangement results in a very high frequency, large deviation FM modulator which is capable of center frequency range from 1 to 20 mHz. with linear deviation of at least 2 mHz.

Typical values for the disclosed embodiment of my invention, are as follows:

B+—6v.
Transistor 11—2N709
Transistor 21—2N709
Voltage on base 13—200 mv.
Resistor 31—2K
Source 2—20 v. DC.
Transistor 42—2N3640
Diode 41—1N3713
Source 51—20 v. DC.
A.C. peak to peak source 52—5 v. p-p
Resistor 53—20K
Capacitor 60—30 pf.

It will be understood that the above values have been chosen so that the transistors do not saturate when conducting. As a result, switching time of the transistors is extremely fast.

It will now be obvious to those skilled in the art that there are many modifications and variations for accomplishing any or all of the objects of my invention and realizing many or all of its advantages but which, however, do not essentially depart from the spirit of the invention.

I claim:

1. An oscillator comprising a current switch having a first branch including a first transistor and a second branch including a second transistor, said first and said second branches having a common current source so that said first and said second transistors are alternately conductive, a charging capacitor connected across said first transistor, said capacitor being charged during conduction of said second branch and discharged during conduction of said first branch, semiconductor threshold means connected to the base of said second transistor to effect conduction and non-conduction of said first and said second transistors, and output means connected across said charging capacitor.

2. An oscillator as set forth in claim 1 wherein the emitters of said first and said second transistors are operatively connected to said current source.

3. An oscillator as set forth in claim 2 wherein said threshold means includes a tunnel diode operatively connected to said base of said second transistor responsive to a predetermined charge on said capacitor to render said second transistor nonconductive and said first conductive.

4. A modulator comprising a non-saturating current switch having a first branch including a first transistor and a second branch including a second transistor, a constant current source, emitters of said first and said second transistors operatively connected in common and to said current source so that conduction of said first transistor renders said second transistor nonconductive and conduction of said second transistor renders said first transistor nonconductive, a charging capacitor connected across said first transistor, a signal source connected to said first transistor for charging said capacitor during non-conduction of said first transistor, semiconductor threshold means connected to the base of said second transistor to render said second transistor nonconductive in response to a predetermined charge on said capacitor thereby to render said second transistor nonconductive and said first transistor conductive to effect discharging of said charging capacitor through said first transistor, and output means connected across said charging capacitor.

5. A modulator as set forth in claim 4 wherein said thresholding means includes a tunnel diode operatively connected to the base of said transistor and responsive to a predetermined charge on said capacitor to render said second transistor nonconductive and said first transistor conductive.

References Cited

UNITED STATES PATENTS

| | | | |
|---|---|---|---|
| 3,215,854 | 11/1965 | Mayhew | 307—286 X |
| 3,254,238 | 5/1966 | Cooperman | 307—286 X |
| 3,290,617 | 12/1966 | Bellem | 332—16 X |
| 3,412,265 | 11/1968 | Cornish | 307—247 |
| 3,441,874 | 4/1969 | Bennett | 307—228 X |

ALFRED L. BRODY, Primary Examiner

U.S. Cl. X.R.

307—246, 247, 252, 286; 331—107, 115; 332—14, 24, 30